June 29, 1954   K. A. STOFEN   2,682,568
BATTERY CAP
Filed Nov. 2, 1951

INVENTOR
KENNETH A. STOFEN

BY Gerald P. Welch
ATTORNEY

Patented June 29, 1954

2,682,568

UNITED STATES PATENT OFFICE 2,682,568

BATTERY CAP

Kenneth A. Stofen, Racine, Wis.

Application November 2, 1951, Serial No. 254,487

1 Claim. (Cl. 136—177)

This invention relates to improvements in snap caps for storage batteries, and more particularly to a novel one piece molded snap cap for storage batteries.

An object of the invention is to provide a device of the type which will fit tightly on a storage battery but which may be quickly opened and closed with a snapping movement, obviating the necessity of unscrewing battery caps as is necessary with the present conventional batteries.

Another object of the invention is to provide a device of the type having an air chamber so formed and vented that water and battery acids will not splash out through the vent holes of the battery cap.

Other and further objects of the invention will appear as the description proceeds, reference being had to the accompanying drawing, in which.

Figure 1:
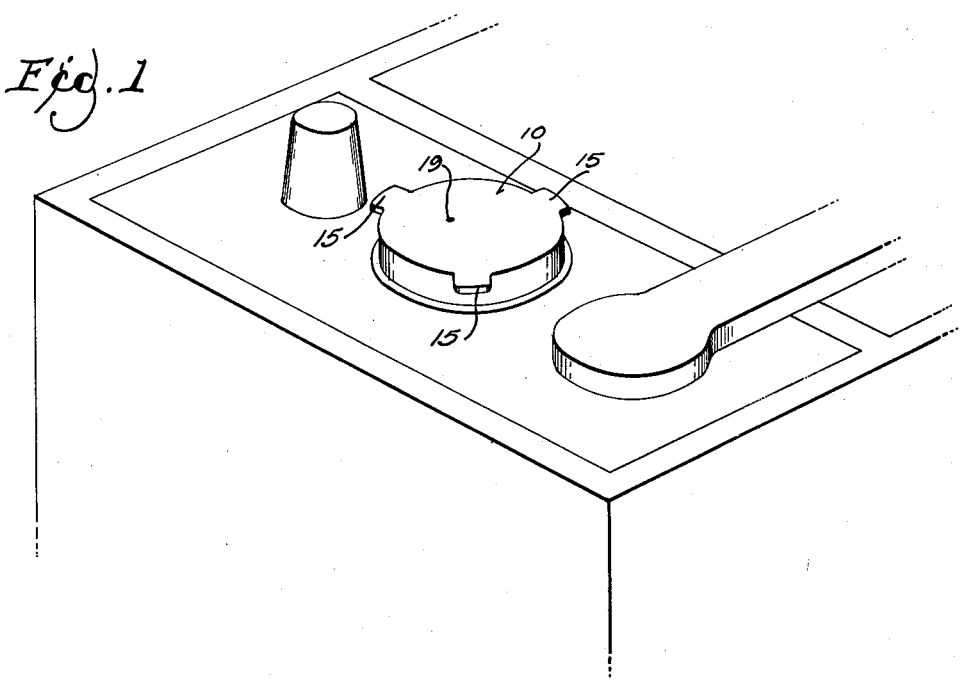
Fig. 1 is a view in perspective of a portion of a conventional battery showing a snap cap embodying the invention applied thereto.
Figure 2:
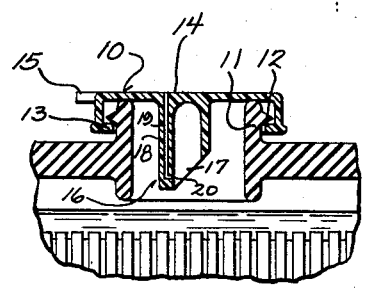
Fig. 2 is a fragmentary vertical section through a battery and cap.
Figure 3:
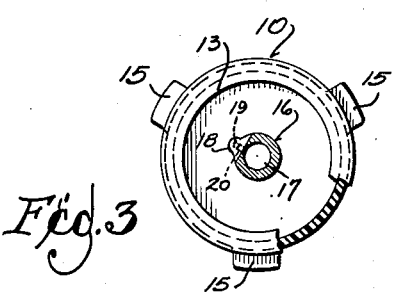
Fig. 3 is a bottom view partially broken away of the cap.
Figure 4:
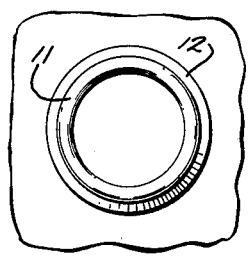
Fig. 4 is a top view in elevation of the battery cell neck.
Figure 5:
Fig. 5 is a fragmentary vertical section through a battery cover and cap showing threaded engagement.

Referring more particularly to the drawings, the numeral 10 refers to the battery cap which is to be made of a flexible material of a type impervious to the action of battery acid. Certain plastic compositions have the requisite resiliency required in forming this product.

The battery neck 11 is formed with an external tapered ridge 12. The cap 10 has an annular inwardly directed rim 13 thereon adapted to engage or snap over the ridge 12. The top 14 of the cap 10 has three radial extensions or ears 15 on a plane therewith which are useful in obtaining leverage for snapping the cap off or on the neck 11.

Depending centrally downwardly from the top 14 of the cap 10 is a tubular formation 16 having an oblique opening 17 at the lower end thereof. An enlarged portion 18 of the tubular formation 16 has therein an angular vent comprised of a vertical leg 19 and the short horizontal leg 20, the latter opening within the tubular formation 16 adjacent its lower open end 17. The leg 19 is open through the top 14 of the cap 10.

It will be understood that the tubular formation herein described may be embodied in a battery cap having the conventional threaded means of attachment.

The tubular formation 16 provides an air chamber in which when water and battery acid splashes upwardly, the pressure forces it to reverse direction, but before pressure builds up enough to force the water and acid out through the vents 19, 20, the pressure is released at the upper point of the oblique opening at 17. The vent 20 being at right angles to the air chamber within the tubular member 16, the water and battery acid cannot escape through the vents 19, 20, during the splashing time of the water and acid. The inner ring 13 fits over the tapered ridge 12 very tightly and secures the cap 10 against the top of the neck 11 to prevent any possible leakage at this point. In use, the cap may be snapped on or off very quickly by means of the projecting ears 15. The cap may be molded in one piece of any suitable plastic resilient material such as "Alathon" polythene resin. This material is resistant to acids occurring in a battery, and also has the resiliency adapted for use as a snap cap.

It will be understood that the device is capable of many modifications in structure and design, without departing from the spirit of the invention, within the scope of the appended claim.

Having thus described the invention, what is claimed and desired to be secured by Letters Patent of the United States, is:

In combination with a battery neck provided with an external annular tapered ridge, a battery cap of plastic resilient material, a flat portion therein, an integral vertical downwardly directed skirt thereon, an inwardly directed ridge portion on the bottom of said skirt adapted to engage over the neck ridge, a central depending tubular portion within said cap having an oblique opening at the lower end thereof, a vertically extending enlarged portion in said tubular portion having a vertical vent open through the top of said cap communicating with a horizontal vent open interiorly of said tubular portion, and a plurality of radial tabs integral with said cap to assist in removing the latter.

References Cited in the file of this patent

UNITED STATES PATENTS

| Number | Name | Date |
| --- | --- | --- |
| 1,010,695 | Sloan | Dec. 5, 1911 |
| 1,012,096 | Pearce | Dec. 19, 1911 |
| 1,244,909 | Skinner | Oct. 30, 917 |
| 1,260,379 | Hazelett | Mar. 26, 1918 |
| 1,869,258 | Holland | July 26, 1932 |
| 1,996,292 | Harding et al. | Apr. 2, 1935 |
| 2,321,892 | Bergstrom | June 15, 1943 |
| 2,480,437 | Berg et al. | Aug. 30, 1949 |

FOREIGN PATENTS

| Number | Country | Date |
| --- | --- | --- |
| 329,188 | Great Britain | May 15, 1930 |
| 932,940 | France | Apr. 6, 1948 |